United States Patent
Kovacs, Jr.

(10) Patent No.: US 8,376,672 B2
(45) Date of Patent: Feb. 19, 2013

(54) DEVICE FOR SECURING SEVERAL PIPES RELATIVE TO ONE ANOTHER DURING STORAGE AND TRANSPORT

(75) Inventor: George A. Kovacs, Jr., Ebstorf (DE)

(73) Assignee: Thread Guard Technology Ltd., Gibraltar (GI)

( * ) Notice: Subject to any disclaimer, the term of this patent is extended or adjusted under 35 U.S.C. 154(b) by 0 days.

(21) Appl. No.: 13/270,445

(22) Filed: Oct. 11, 2011

(65) Prior Publication Data

US 2012/0093608 A1    Apr. 19, 2012

(30) Foreign Application Priority Data

Oct. 13, 2010    (DE) .......................... 10 2010 048 176

(51) Int. Cl.
*B60P 7/12* (2006.01)
(52) U.S. Cl. ......................................................... 410/47
(58) Field of Classification Search .................... 410/32, 410/34, 36, 39, 40, 42, 47
See application file for complete search history.

(56) References Cited

U.S. PATENT DOCUMENTS

| | | | | |
|---|---|---|---|---|
| 1,760,130 A * | 5/1930 | Forrest | ............................ | 410/47 |
| 4,491,446 A * | 1/1985 | Ewald | .............................. | 410/32 |
| 4,685,412 A * | 8/1987 | Harris et al. | .................. | 114/238 |
| 5,123,547 A * | 6/1992 | Koch | ........................... | 211/59.4 |
| 6,261,037 B1 * | 7/2001 | Richards et al. | ................ | 410/36 |
| 6,524,042 B2 * | 2/2003 | Chasen | ......................... | 410/120 |
| 6,599,069 B2 * | 7/2003 | Ross | .............................. | 410/36 |

FOREIGN PATENT DOCUMENTS

AU    2005315252 B2    6/2006

* cited by examiner

*Primary Examiner* — H Gutman
(74) *Attorney, Agent, or Firm* — Gudrun E. Huckett

(57) ABSTRACT

A securing device for securing several pipes during storage and transport has pipe securing bodies that in an operating position are positioned above and below each pipe layer. The pipe securing bodies have a top side and a bottom side with oppositely positioned, spaced-apart recesses for pipes. A clamping arrangement is arranged at both end faces of the pipe securing bodies and clamps the pipe securing bodies to a clamped unit. The clamping arrangement has a first hook and a second hook at opposite ends. A lever device is arranged between the first and second hooks and acts on the hooks so as to transfer them with a leverage force from a released position, in which the securing device can be mounted and demounted, into an operating position. A relative spacing of the first and second hooks in the operating position is smaller than in the released position.

12 Claims, 7 Drawing Sheets

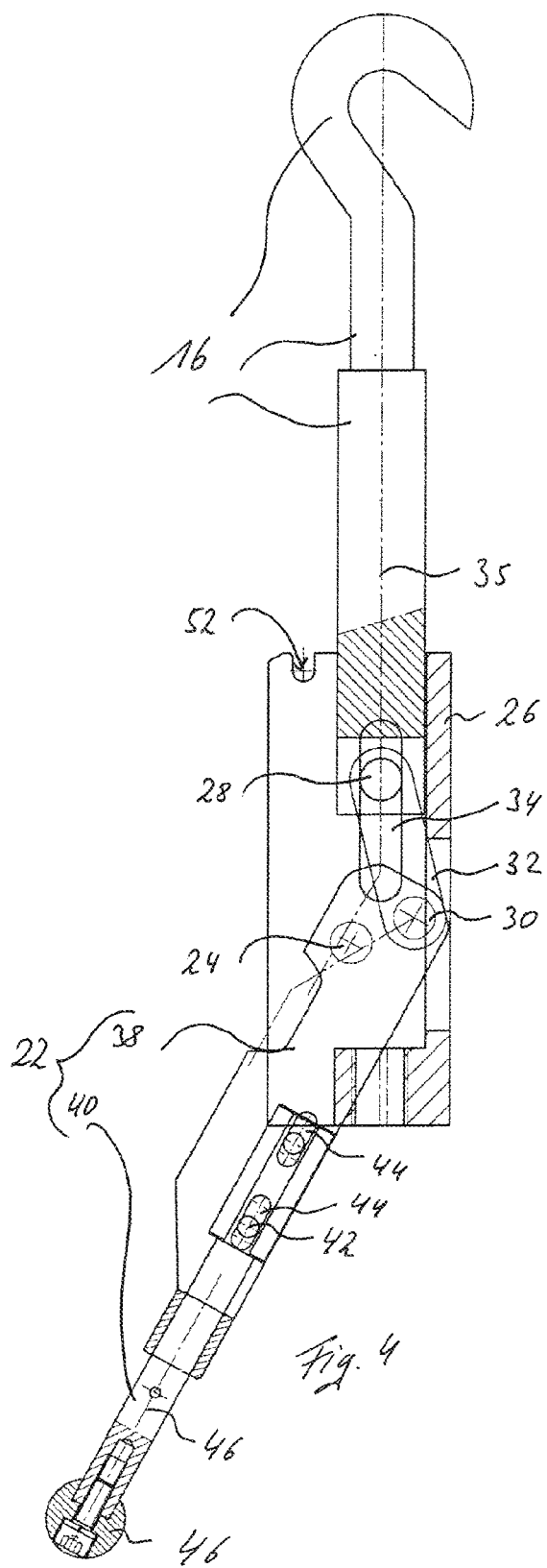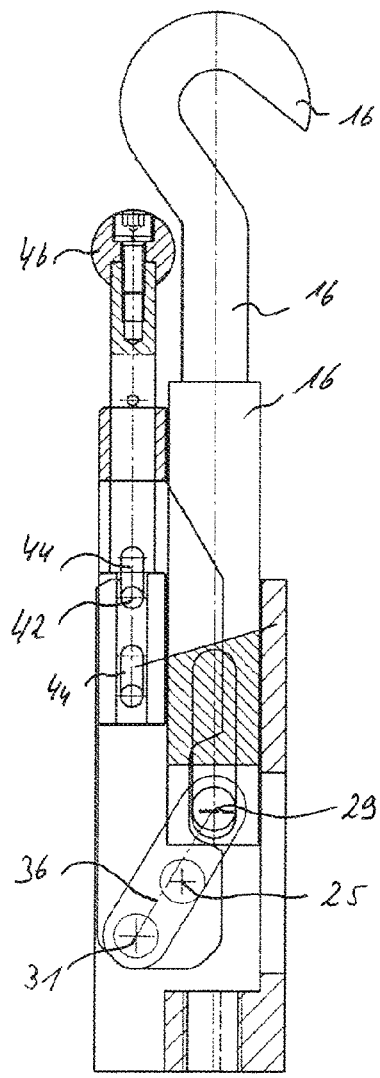
Fig. 4
Fig. 5

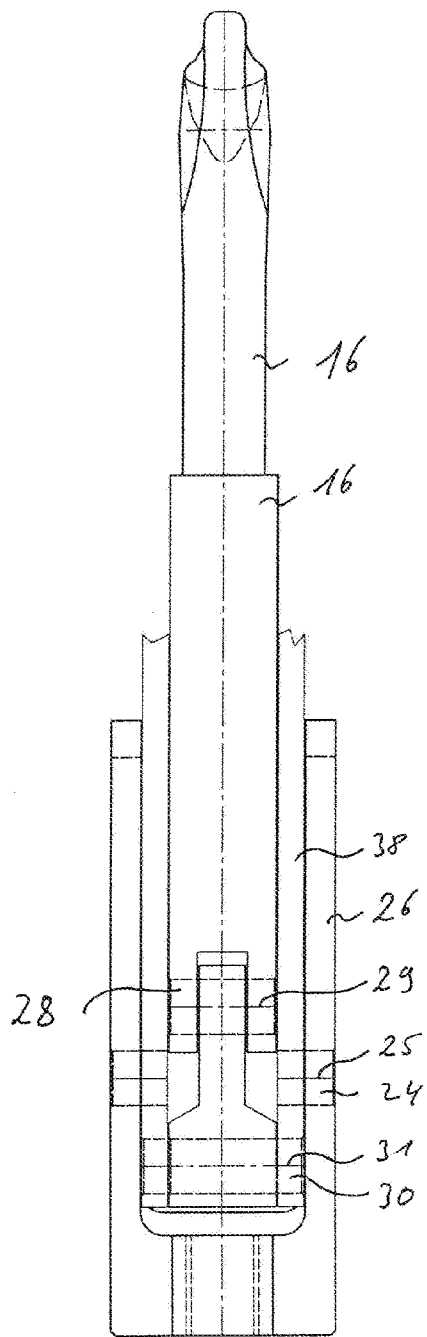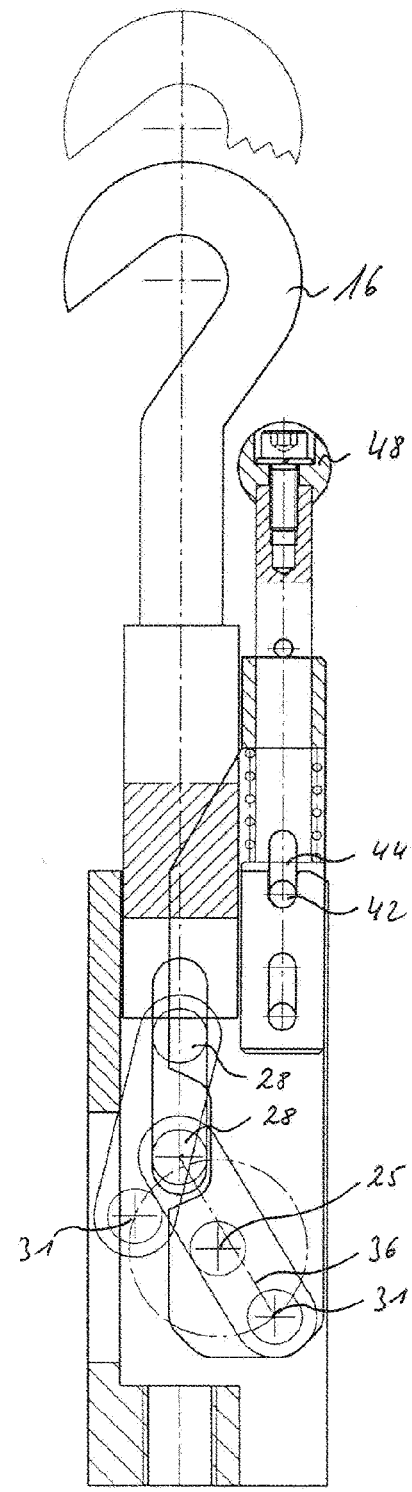
Fig. 7
Fig. 8

DEVICE FOR SECURING SEVERAL PIPES RELATIVE TO ONE ANOTHER DURING STORAGE AND TRANSPORT

BACKGROUND OF THE INVENTION

The invention relates to a securing device for securing several pipes relative to each other during their storage and transport. The securing device comprises pipe securing bodies that have at their top side and their bottom side a plurality of opposed recesses that are spaced apart from each other for receiving a pipe, respectively. In an operating position of the securing device, the pipe securing bodies are arranged in vertical direction above and below each layer of pipes and can be clamped to each other to form a clamped unit by means of a clamping device that is arranged in continuous vertical grooves at the two end faces of the pipe securing bodies.

Such a securing device is disclosed in AU 2005315252 B2.

Based on this type of securing device of the aforementioned kind, the invention has the object of providing a securing device that can be clamped quickly without requiring additional tools and that remains clamped permanently during transport, even in case of inclement weather conditions.

SUMMARY OF THE INVENTION

In accordance with the present invention, this is achieved for a securing device of the aforementioned kind in that the clamping device has at one end a first hook and at the other end a second hook and further has between these two hooks a lever device. By means of the lever device, positioning of the hooks relative to each other can be transferred by means of leverage force from a released position, in which the securing device can be mounted and demounted, into an operating position. The spacing of the hooks relative to each other in the operating position is smaller than in the released position. By means of the lever device, the hooks are moved toward each other in one movement from the released position into the operating position. In this connection, the hooks engage suitable receptacles of the pipe securing bodies and clamp the pipe securing bodies relative to each other. In this connection, the hooks are engagement means that engage the receptacle of the pipe securing bodies, wherein the hooks also may comprise a shaft as an extension and guide. With this configuration of the clamping arrangement, clamping without additional tools is possible, wherein the clamping action is permanently maintained even under inclement conditions during transport.

Advantageously, the lever device has a lever arm that, by means of a lever pivot bolt, is pivotably supported relative to a lever guide body. The lever arm is pivoted about the axis of the lever pivot bolt. On the first hook, a follower, preferably in the form of a follower bolt, is attached, and the second hook is connected fixedly to the lever guide body. On the lever arm, an articulation bolt is arranged that by means of an articulation member is connected to the follower. During a leverage movement of the lever arm about the axis of the lever pivot bolt, the axis of the articulation bolt moves on a circular path about the axis of the lever pivot bolt and entrains during this movement by means of the articulation member the follower which is fixedly connected to the first hook. The first hook is thus pulled toward the lever guide body during a movement from the released position into the operating position. The axes of the lever pivot bolt, the articulation bolt and the follower are preferably arranged so as to extend parallel to each other. In this way, a particularly stable configuration of the clamping device is ensured that also requires only little maintenance.

It is particularly preferred that the follower is formed by a follower bolt that has two ends that are guided in slotted holes that are arranged in the lever guide body, respectively. The movement of the first hook that is connected to the follower is thus guided by the position of the slotted holes. They are preferably arranged parallel to the longitudinal center axis of the clamping arrangement.

In an advantageous embodiment of the invention, the articulation bolt, the follower and the lever pivot bolt are arranged relative to each other such that an imaginary connecting line between the axis of the pivot bolt and the center axis of the follower during a movement of the lever from the released position into the operating position is pivoted past and beyond the axis of the lever pivot bolt. With this configuration, it is ensured that the lever arm will not accidentally move without a force action from the operating position back into the released position.

Advantageously, the lever arm has a lever arm base and a lever arm extension as separate components. On the lever arm base the lever pivot bolt and the articulation bolt are arranged. The lever arm extension has projections that are slidably guided in elongate guide recesses of the lever arm base parallel to the longitudinal axis of the lever arm. Preferably, the lever arm extension is slidably arranged against the force of a spring in the direction opposite to the lever arm base and parallel to the longitudinal axis of the lever arm. Advantageously, in this connection at least one of the projections of the lever arm extension engages in the operating position a complementarily shaped securing recess of the lever arm body and is secured in this position by means of the spring. For transferring the clamping arrangement from the operating position into the release position, the lever arm extension must first be pulled parallel to the longitudinal center axis of the clamping arrangement in the direction of the first hook against the force of the spring wherein the at least one projection of the lever arm extension is moved out of the securing recess. Only then a rotational movement of the lever arm about the axis of the lever pivot bolt is possible. With this configuration, it is thus achieved that the clamping arrangement in the operating position is secured against accidental release into the released position.

Advantageously, the lever arm extension has on the end that is opposite the lever arm base a grip element. In this way, an actuation of the lever arm extension is facilitated.

In an especially preferred embodiment of the invention, the clamping arrangement in the operating position is arranged completely within the groove of the pipe securing body. This means that the clamping arrangement in the operating position is arranged within a parallelepiped (rectangular box shape) whose corner points are defined by the outer corners of the pipe securing bodies. In this way, it is possible to stack or pack the pipe securing bodies of the present invention, that are clamped to a clamped unit in the operating position, very tightly adjacent to each other and on top of each other.

Advantageously, the clamping arrangement has one or several extension elements that are arranged between first hook and second hook so as to extend the clamping arrangement to a defined length. By means of the exact sizing of the extension elements it is possible to adjust the spacing of the first hook to the second hook to precisely the length that results for a predetermined shape of the pipe securing bodies and the pipes clamped between them and the corresponding number of pipes and pipe securing bodies so that the securing device in the operating position provides a secure clamping action without play.

Advantageously, the first hook and the second hook as well as all parts of the clamping device connecting the first and second hooks are made of an inflexible material, in particular of metal. This configuration ensures a fast and reliable clamping action of the securing device in the operating position that does not yield as a result of changing temperature conditions or as a result of moisture.

BRIEF DESCRIPTION OF THE DRAWING

FIG. 4 is a detail view of the clamping arrangement in the released position.

FIG. 5 shows the device of FIG. 4 in the operating position.

FIG. 7 shows the first hook as well as a part of the lever device in a view of the rear side.

FIG. 8 shows the object of FIG. 5 rotated by 180 degrees and, in addition, the position of the hook as well as of the pivot axes and the articulation member in the released position and in the operating position.

In the following, parts of the invention that act in the same way, inasmuch as this is meaningful, are identified with identical reference numerals.

Figure 1:
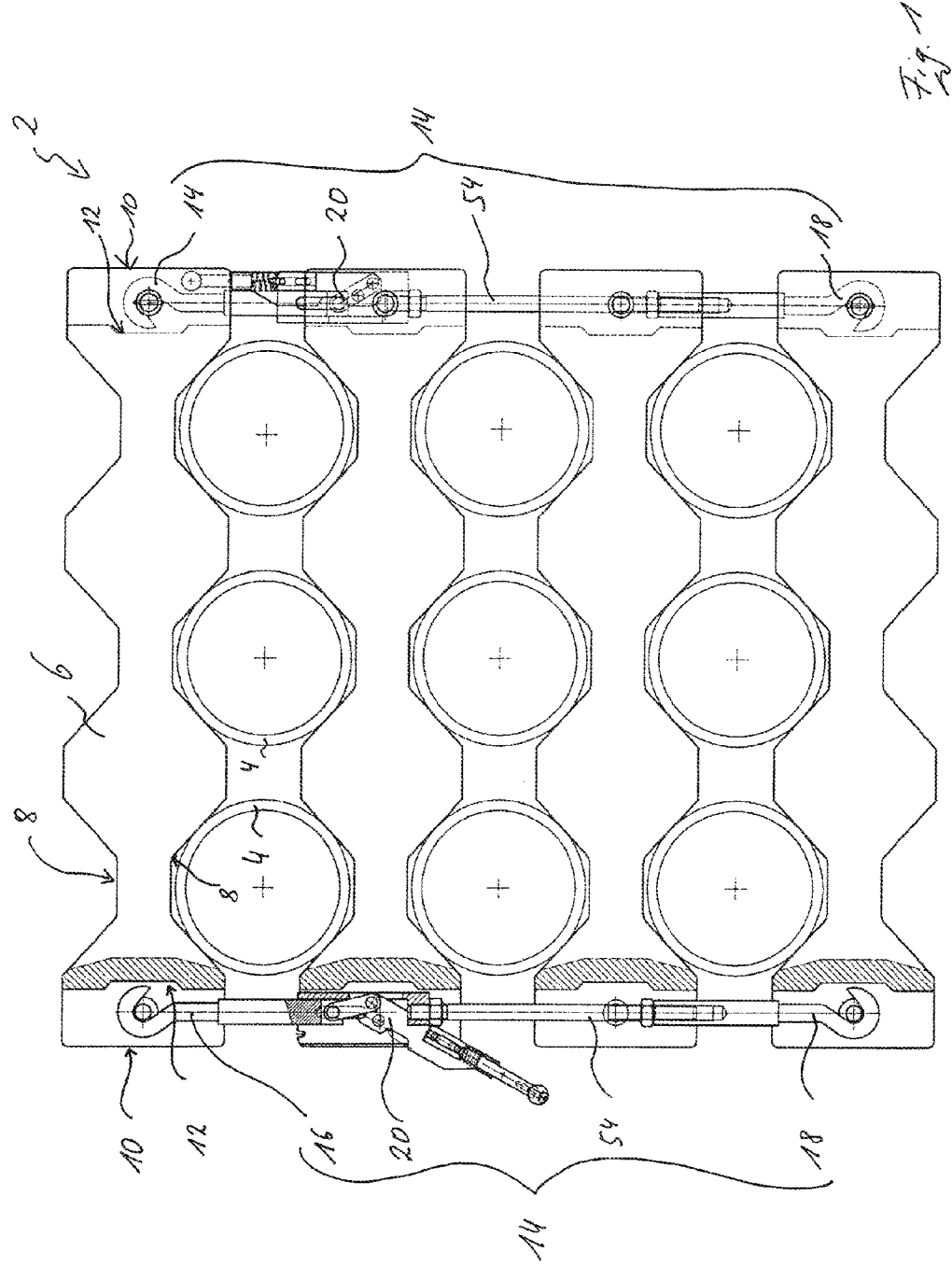
FIG. 1 shows a securing device according to the invention in a partially sectioned side view.

The features of the illustrated embodiment according to the invention described in the following can also be the subject matter of the present invention when used individually or in combinations other than the illustrated embodiment.

REFERENCE NUMERALS 2 securing device
4 pipes
6 pipe securing body
8 recesses
10 end face
12 groove
14 clamping arrangement
16 first hook
18 second hook
20 lever device
22 lever arm
24 lever pivot bolt
25 axis of lever pivot bolt
26 lever guide body
28 follower, follower bolt
29 axis of the follower
30 articulation bolt
31 axis of the articulation bolt
32 articulation member
34 slotted holes
35 longitudinal center axis of the clamping arrangement
36 connecting line
38 lever arm base
40 lever arm extension
42 projections
44 guide recesses
46 longitudinal axis of the lever arm
48 grip element
50 spring
52 securing recess
54 extension element

DESCRIPTION OF THE PREFERRED EMBODIMENTS

FIG. 1 shows a securing device 2 according to the invention for securing a plurality of pipes 4 relative to each other during their storage and transport in a predetermined arrangement adjacent to each other and stacked in spaced-apart layers. The securing device 2 has pipe securing bodies 6 that have at the top side and bottom side a plurality of oppositely positioned spaced-apart recesses 8 for receiving the pipes. In operating position of the securing device 2, the pipe securing bodies 6 are positioned in vertical direction below and above each of the pipe layers and can be securely clamped to a clamped unit by means of a clamping arrangement 14, arranged in a continuous vertical groove 12 provided at both end faces 10 of the pipe securing bodies 6.

The clamping arrangement 14 has at one end a first hook 16 and at the other end a second hook 18 and between the hooks 16, 18 a lever device 20. By means of this lever device 20, positioning of the hooks 16, 18 relative to each other can be transferred by means of a leverage force from a released position, in which the securing device 2 can be mounted and demounted, into an operating position. In this connection, the spacing of the hooks 16, 18 relative to each other in the operating position is smaller than in the released position. FIG. 1 shows two such clamping arrangements 14 wherein the clam ping arrangement 14 to the right is already in the operating position and the clamping arrangement 14 shown to the left is in a released position.

Figure 2:
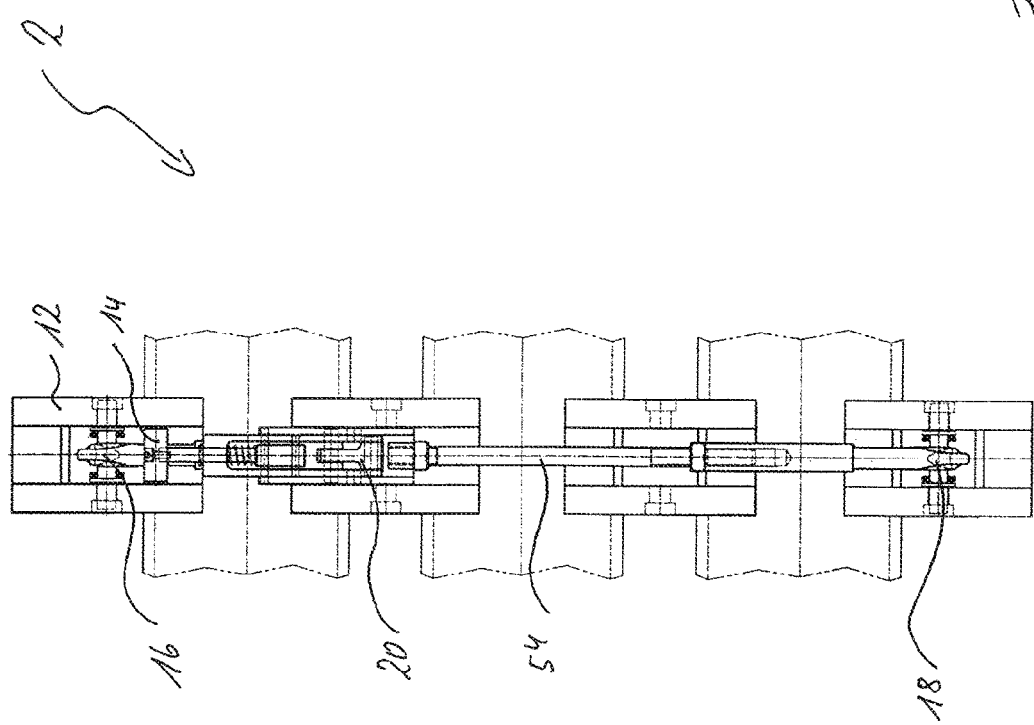
FIG. 2 shows the securing device of FIG. 1 in an end view.
Figure 3:
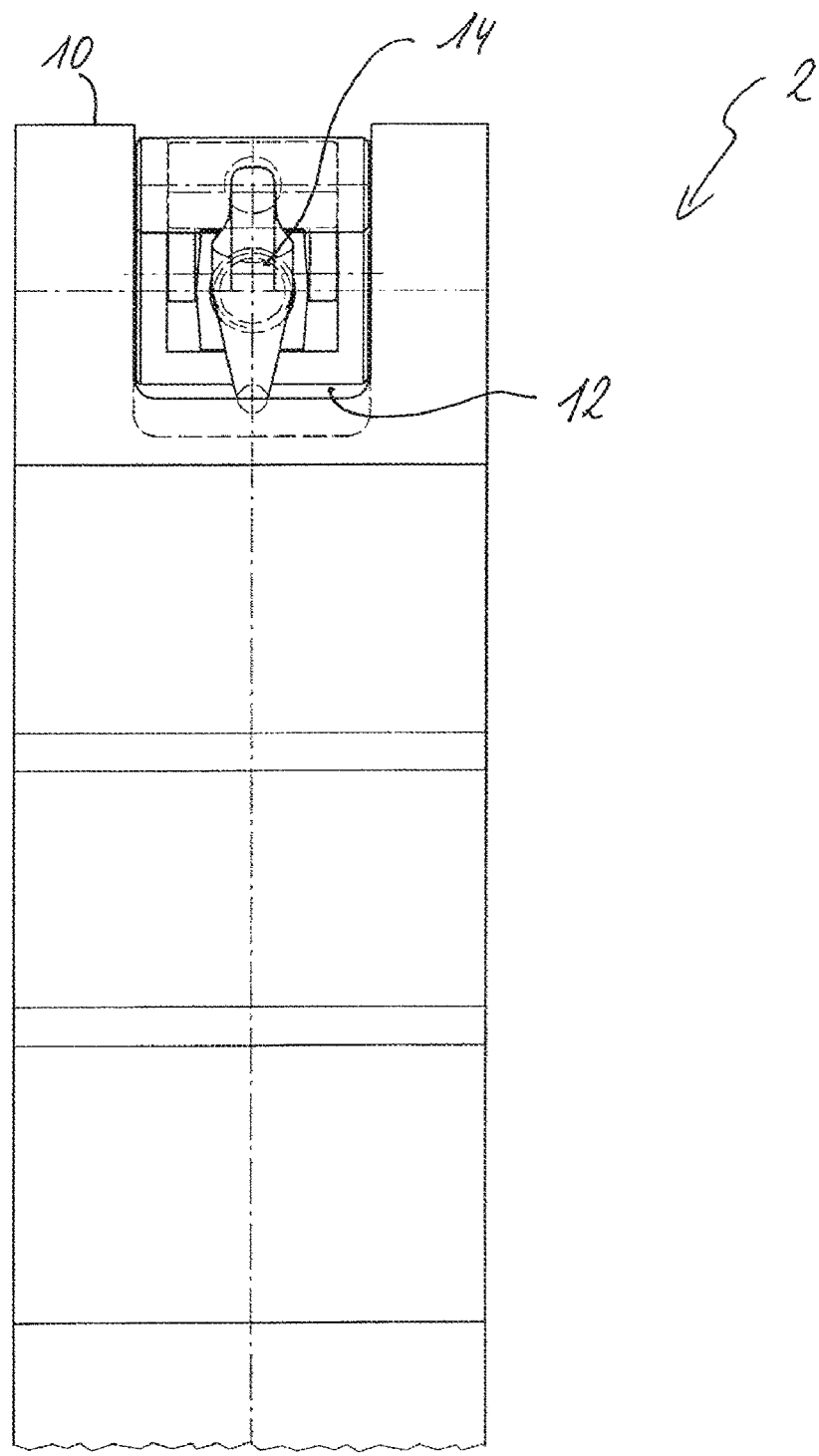
FIG. 3 is a detail view of the securing device of FIG. 2 in plan view.
Figure 6:
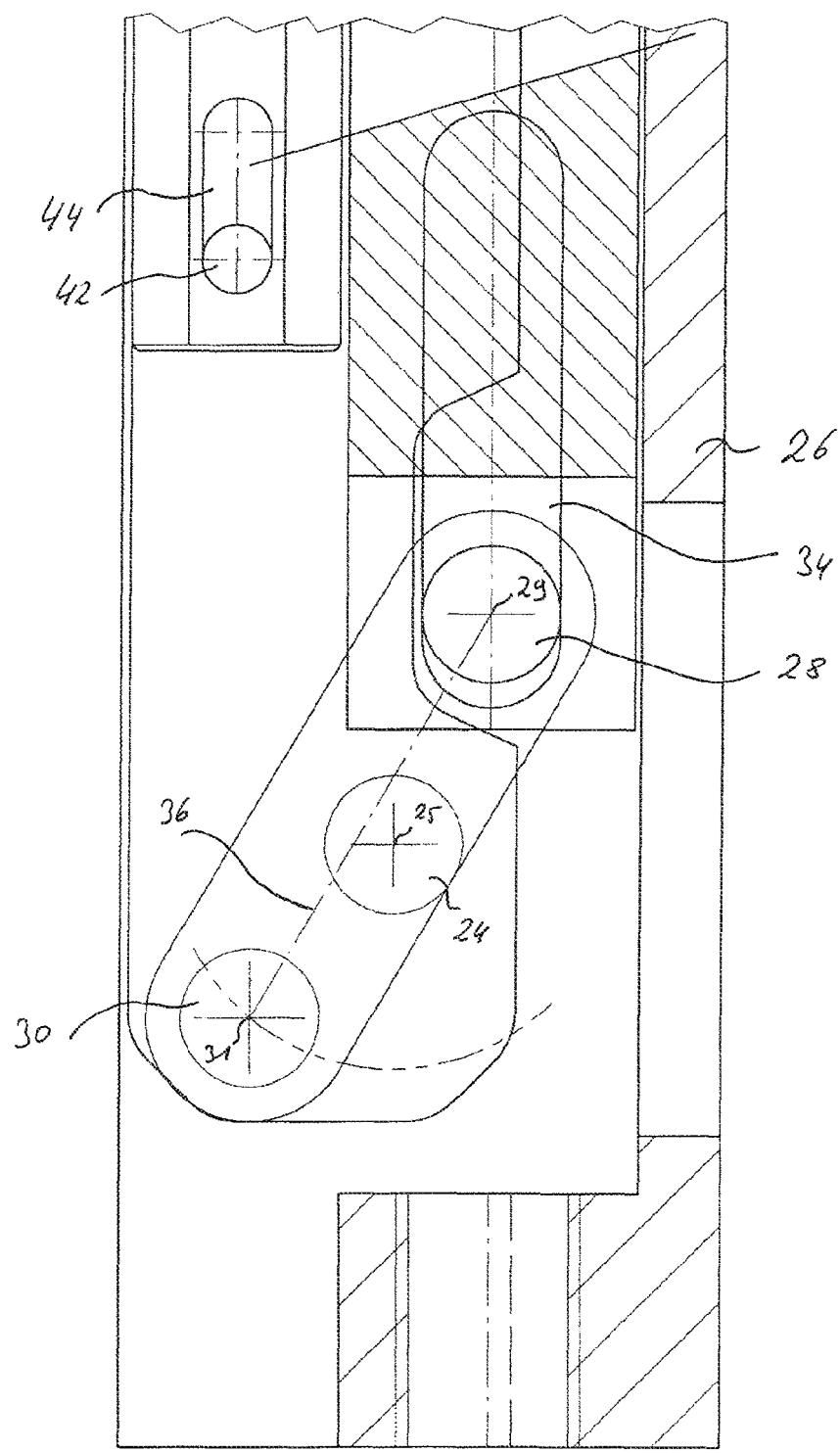
FIG. 6 shows the object of FIG. 5 in a detail view.

FIG. 2 shows the securing device 2 according to the invention in a detail view from the side and FIG. 3 from above. FIGS. 2 and 3 show that the clamping arrangement 14 in operating position is housed completely within the groove 12.

FIGS. 4 to 8 each show details of the clamping arrangement 14. In FIG. 4, the lever device 10 is in a released positioned and in comparison thereto in FIG. 5 is in operating position. The lever device 20 has a lever arm 22 that is pivotably supported by means of a lever pivot bolt 24 relative to a lever guide body 26. On the first hook 16 a follower 28 is provided that is in the form of a follower bolt in the illustrated embodiment. The second hook 18 is connected fixedly to the lever guide body 26 as shown in particular in FIG. 9. On the lever arm 22 an articulation bolt 30 is arranged that is connected by an articulation member 32 with the follower bolt 28. The follower bolt 28 has ends each guided in a slotted hole 34; the slotted holes 34 are arranged in the lever guide body 26, respectively, and extend parallel to the longitudinal center axis 35 of the clamping arrangement 14.

Articulation bolt 30, follower 28 and lever pivot bolt 24 are arranged relative to each other such that an imaginary connecting line 36 between the axis 31 of the articulation bolt 30 and the center axis 29 of the follower bolt 28 during a movement of lever arm 22 from the released position into the operating position can be pivoted past and beyond the axis 25 of the lever pivot bolt 24. The aforementioned three axes 31, 29, 25 are arranged parallel to each other.

The lever arm 22 has a lever arm base 38 and lever arm extension 40, provided as separate components. On the lever arm base 38 the lever pivot bolt 24 and the articulation bolt 30 are arranged. The lever arm extension 40 has projections 42 that are slidably guided in longitudinal guide recesses 44 of the lever arm base 38 in a direction parallel to the longitudinal axis, illustrated by line 46, of the lever arm 22. The lever arm extension 40 has a grip element 48 and is arranged so as to be slidable against the force of a spring 50 in a direction opposite to the lever arm base 38 and parallel to the longitudinal axis 46 of the lever arm 22. The projections 42 of the lever arm extension 40 engage in operating position in complementarily shaped securing recesses 52 of the lever guide body 26 and are secured therein by means of the spring 50 in this position.

Figure 9:
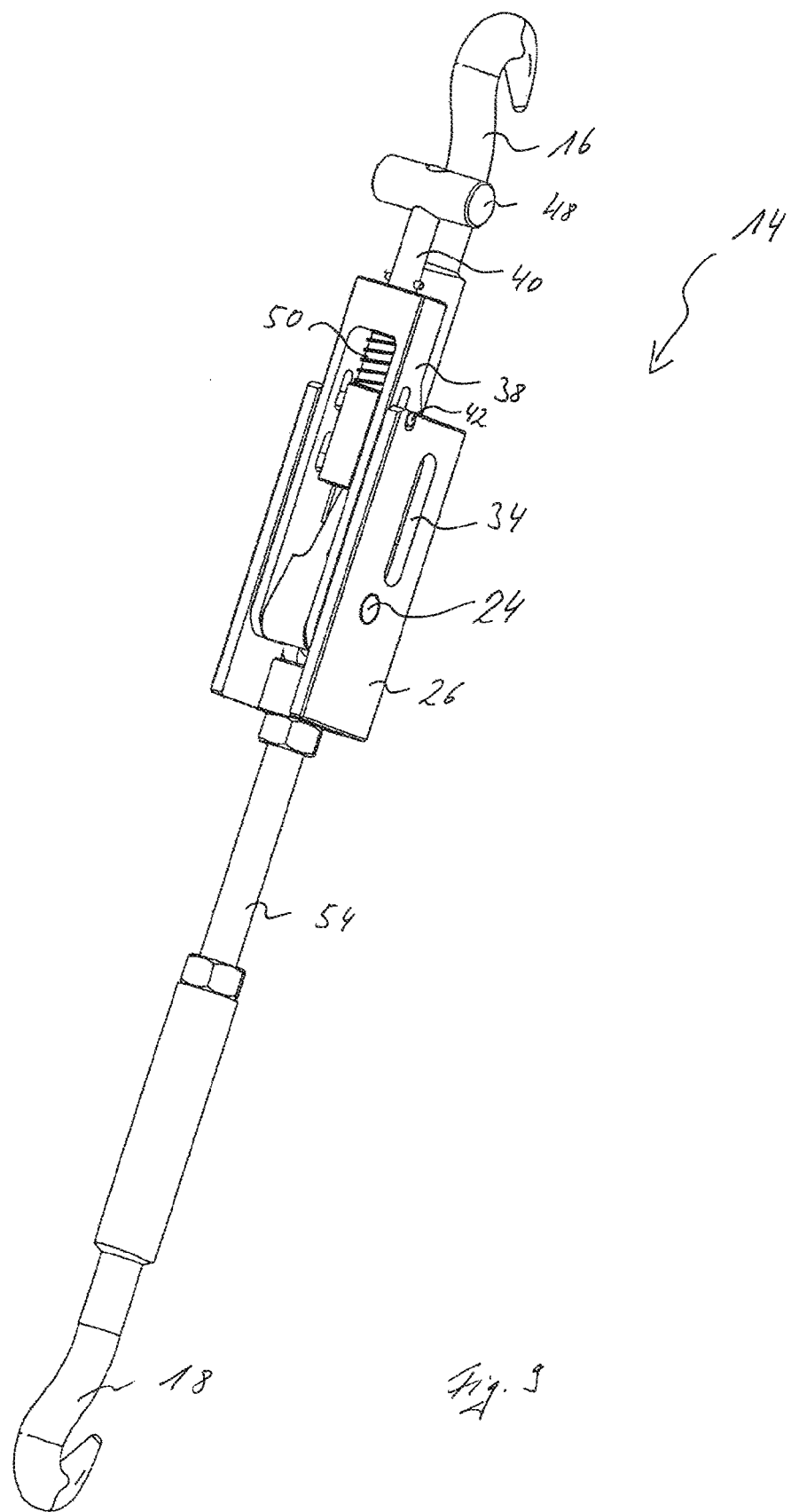
FIG. 9 shows the clamping arrangement in a three-dimensional illustration.

FIG. 9 shows the clamping arrangement 14 in a three-dimensional illustration in the operating position. The clamping arrangement 14 has an extension element 54 that is arranged between first hook 16 and second hook 18 so as to extend the clamping arrangement 14 to a defined length.

The specification incorporates by reference the entire disclosure of German priority document 10 2010 048 176.9 having a filing date of Oct. 13, 2010.

While specific embodiments of the invention have been shown and described in detail to illustrate the inventive principles, it will be understood that the invention may be embodied otherwise without departing from such principles.

What is claimed is:

1. A securing device for securing several pipes relative to each other during storage and transport in a predetermined arrangement adjacent and above each other in spaced-apart layers, the securing device comprising:
   pipe securing bodies that in an operating position are positioned vertically above and below each layer of pipes, wherein the pipe securing bodies each have a top side and a bottom side, wherein the top and bottom sides each have oppositely positioned and spaced-apart recesses for receiving pipes;
   a clamping arrangement arranged at both end faces of the pipe securing bodies in a continuous vertical groove, wherein the clamping arrangement clamps the pipe securing bodies to a clamped unit;
   wherein the clamping arrangement has a first end provided with a first hook and a second end provided with a second hook;
   a lever device arranged between the first and second hooks, wherein the lever device acts on the first and second hooks so as to transfer the first and second hooks relative to each other with a leverage force from a released position, in which the securing device can be mounted and demounted, into an operating position, wherein a spacing of the first and second hooks relative to each other in the operating position is smaller than in the released position.

2. The securing device according to claim 1, wherein the lever device comprises a lever arm and a lever guide body, wherein the lever arm is pivotably supported on a lever pivot bolt relative to the lever guide body, wherein on the first hook a follower is arranged and the second hook is fixedly connected to the lever guide body, wherein on the lever arm an articulation bolt is arranged that is connected by an articulation member to the follower.

3. The securing device according to claim 2, wherein the follower is a follower bolt that has opposed ends guided in slotted holes provided in the lever guide body.

4. The securing device according to claim 2, wherein the articulation bolt, the follower, and the lever pivot bolt are arranged relative to each other such that a connecting line between an axis of the articulation bolt and a central axis of the follower during a movement of the lever arm from the released position into the operating position is pivoted past and beyond the axis of the lever pivot bolt.

5. The securing device according to claim 2, wherein the lever arm comprises a lever arm base and a lever arm extension as separate components, wherein on the lever arm base the lever pivot bolt and the articulation bolt are arranged, wherein the lever arm extension has projections which are slidably guided in elongate guide recesses of the lever arm base in a direction parallel to a longitudinal axis of the lever arm.

6. The securing device according to claim 5, wherein the lever arm extension is arranged to be movable against a force of a spring in a direction opposite to the lever arm base and parallel to a longitudinal axis of the lever arm.

7. The securing device according to claim 6, wherein at least one of the projections of the lever arm extension in the operating position engages a complementary securing recess of the lever guide body and is secured by the spring in the position engaging the complementary securing recess.

8. The securing device according to claim 5, wherein the lever arm extension is provided with a grip element at an end opposite the lever arm base.

9. The securing device according to claim 1, wherein the clamping arrangement in the operating position is arranged completely within the groove of the pipe securing bodies.

10. The securing device according to claim 1, wherein the clamping arrangement has at least one extension element that is positioned between the first hook and the second hook so as to extend the clamping arrangement to a defined length.

11. The securing device according to claim 1, wherein the first hook and the second hook and all parts of the clamping arrangement connecting the first and second hooks are made of an inflexible material.

12. The securing device according to claim 11, wherein all parts of the clamping arrangement are made of metal.

* * * * *